March 7, 1944. E. DAIBER 2,343,282
PITOT TUBE
Filed May 28, 1942
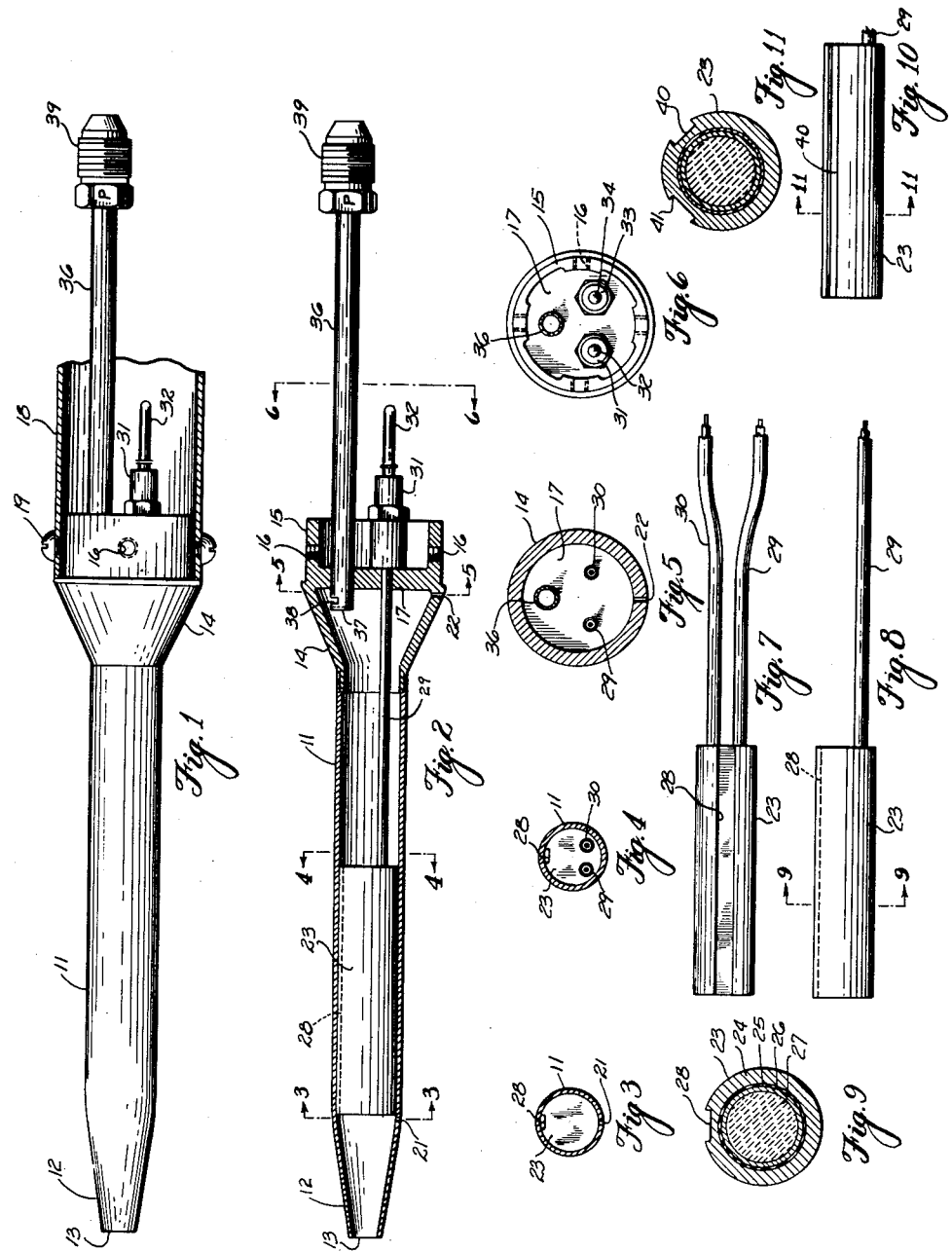
INVENTOR.
EMIL DAIBER
BY Woodling & Krost
ATTORNEYS.

Patented Mar. 7, 1944

2,343,282

UNITED STATES PATENT OFFICE 2,343,282

PITOT TUBE

Emil Dalber, Cleveland, Ohio

Application May 28, 1942, Serial No. 444,872

8 Claims. (Cl. 73—212)

My invention relates to Pitot tubes and more particularly to Pitot tubes utilized in apparatus mounted on aircraft for indicating the speed of the aircraft.

My invention is particularly adapted for use in Pitot tubes mounted upon aircraft to respond to the dynamic or impact pressure created incidental to movement of the aircraft through the air, and therefore the present discussion is based upon that adaptation, although it is to be understood that my invention is not necessarily limited to that adaptation.

Pitot tubes are embodied in apparatus for indicating the speed of aircraft by mounting the tube upon the aircraft wing, outboard strut or other location on the craft where it will encounter undisturbed air-flow. The Pitot tube is connected in communication with suitable tubing or pipe with an airspeed indicator mounted on the instrument panel in the cockpit of the aircraft. The air under dynamic or impact pressure is admitted to the diaphragm pressure capsule in the airspeed indicator. Air under static pressure is admitted to the case of the instrument enclosing the capsule and this opposes the dynamic pressure within the capsule. The indicator instrument is a sensitive differential pressure gauge and indicates the velocity pressure, that is, the difference between the dynamic or impact pressure and the static pressure, upon a dial calibrated in miles per hour.

The Pitot tube being mounted in the open air is subjected to all climatic conditions and is particularly subjected to the moisture content of the surrounding air and to the temperature of the air. The introduction of moisture, either as rain, fog, snow or vapor into the Pitot tube has an unfavorable effect upon the operation and success of the entire apparatus.

Moisture carried into the indicating instrument may corrode the thin diaphragm capsule and impair its efficiency and operability and, as a result, decrease or ruin the effectiveness of the instrument. In the event that moisture enters the internal passages of the Pitot tube, as the aircraft passes through air laden with rain, snow, fog or other form of water, then this moisture may easily clog or obstruct the passages of the tube and the system in communication therewith. Moreover, the temperature of the surrounding air through which the aircraft travels is often so low that the Pitot tube and its contents are below the freezing point of water. The formation of ice within the internal passages of the tube and the system in communication therewith clogs and obstructs the same with the result that the tube and system become inoperative. A Pitot tube which contains frozen moisture becomes worthless and fails to produce the results for which the tube is intended.

It is understood, of course, that the heating of a Pitot tube by an electrical heating element has been previously known. The prior heated tubes were however subject to defects and limitations apparent from a comparison of the prior tubes and my newly invented tube. It is an object of my invention to obviate the defects and limitations of the prior tubes and to provide a Pitot tube of superior efficiency and increased usefulness.

Another object of my invention is to provide an improved Pitot tube of economical construction permitting the use of a minimum of scarce and critical materials and the expenditure of a minimum of time and labor in constructing and assembling the tube, and resulting in a maximum production of completed tubes for use.

Another object is the provision of a simple construction in a Pitot tube and yet arranged to produce superior results.

Another object is the provision for utilizing a heating element in a Pitot tube of limited dimensions.

Another object is the provision for utilizing a heating element of substantially the minimum diameter commercially and practically obtainable in a Pitot tube casing having an inner diameter of substantially the same size as the heating element.

Another object is the provision of an arrangement and construction of internal parts in a Pitot tube so as to meet the requirements as to maximum dimensions of the tube and as to the operating standards to be met.

Another object is the provision for mounting in a small diameter casing a heating element of the minimum diameter that may be commercially and practically made with due regard to the operating requirements of the element.

Another object is the provision of a Pitot tube reduced in weight and yet containing the necessary parts for an efficient operation of the same.

Another object is the provision of a Pitot tube having an improved construction providing for the entrapment and discharge of moisture and for maintaining the temperature of the tube sufficiently high to prevent freezing of moisture in the tube.

And another object is the provision for meeting the requirements as to dimensions, weight and performance of a Pitot tube, said requirements constituting a new standard not readily, economically and efficiently met or satisfied by any arrangements and constructions heretofore known and used in Pitot tubes.

Other objects and a fuller understanding of my invention may be had by referring to the following description and claims, taken in conjunction with the accompanying drawing, in which:

Figure 1 is a side elevational view of my improved Pitot tube;

Figure 2 is a cross-sectional view taken lengthwise of the tube shown in Figure 1;

Figure 3 is a transverse cross-sectional view taken through the tube in the direction of the arrows 3—3 of Figure 2;

Figure 4 is a transverse cross-sectional view taken through the tube in the direction of the arrows 4—4 of Figure 2;

Figure 5 is a transverse cross-sectional view taken through the tube in the direction of the arrows 5—5 of Figure 2;

Figure 6 is an endwise view of the tube shown in Figure 2 looking in the direction of the arrows 6—6 of Figure 2;

Figure 7 is a plan view of the electrical heating element utilized in the tube shown in Figure 2;

Figure 8 is a side elevational view of the electrical heating element shown in Figure 7 and utilized in my tube;

Figure 9 is a transverse cross-sectional view taken through the heating element in the direction of the arrows 9—9 of Figure 8, and being enlarged double size from that of Figure 8;

Figure 10 is a side elevational view of a modified form of electrical heating element utilizable in my tube; and Figure 11 is a transverse cross-sectional view taken through the modified heating element in the direction of the arrows 11—11 of Figure 10, and being enlarged double size from that of Figure 10.

My improved Pitot tube has an outer casing or tubular member 11 of hollow cylindrical shape as shown by the several views of the drawing. The forward end, that is the left-hand end of Figures 1 and 2, is somewhat tapered to form the tapered portion 12. As the casing is preferably made of brass or copper tubing or similar heat conducting and non-magnetic material the tapered portion 12 may be formed by spinning. At the rearward end of the tube, that is the right-hand end of the tube shown in Figures 1 and 2, an annular casting or rear-end member 14, of copper, brass, or other suitable material, is interfitted with, and secured to, the end of the casing 11 by silver soldering or by other suitable means. The member 14 has a supporting portion 15 extended therefrom for providing a suitable support or engaging element for the tube. Threaded holes 16 in the supporting portion are provided for receiving screw bolts 19 extending through registering openings in a suitable bracket or mounting sleeve 18. The bracket or mounting sleeve 18, of which only a small sectional portion is shown in Figure 1, may be mounted upon a strut, wing or other part of the aircraft in a position to place the Pitot tube in an undisturbed airflow. The bracket or mounting sleeve 18 thus firmly supports the Pitot tube in position. The casting or end member 14 has an end wall 17 which extends transversely of the tube across the annular opening of the member 14 at its maximum diameter and thus the wall 17 provides a closure for the rear-end of the Pitot tube.

At the nose or front end of the casing a round opening 13 is provided for affording communication between the outside of the casing and the interior of the casing. As the Pitot tube is axially aligned in the direction of the flight of the aircraft and as the forward end of the tube meets the air in advance of the tube under impact, the air entering the casing through the forward opening 13 is under dynamic or impact pressure during flight of the aircraft. Therefore, in discussing the air which is introduced into the Pitot tube through the forward opening 13, the air is referred to as air under dynamic or impact pressure, or as sometimes referred to in the art, under Pitot pressure.

It is seen from the views of the drawing that the casing may be divided into three portions, the forward portion, the intermediate portion, and the rearward portion. The intermediate portion has straight sides and a uniform bore. The forward portion has a variable bore increasing from the size of the opening 13 to coincide with the bore of the intermediate portion. The rearward portion has a variable bore increasing from its coincidence with the bore of the intermediate portion to its maximum at the wall 17.

The necessity and immediate instigation of the present invention arose from the requirement and urgent demand for the construction of a complete operative Pitot tube with provisions for the efficient heating of the tube and for the proper entrapment and elimination of moisture in a casing of prescribed and limited dimensions. The outer view of the casing shown in Figure 1 illustrates the limitations and difficulties faced before the making of the present invention. It was required that a Pitot tube having the over-all dimensions of the casing shown in Figure 1 embody proper heating means for preventing freezing of moisture in the casing and proper means for entrapping and discharging the moisture which might enter the casing. The casing of Figures 1 and 2, in the straight portion 11, has an inside diameter of only one-half inch. (The views of Figures 1 and 2 in the drawing accompanying this application are drawn full scale and illustrate the limited dimensions of such a casing.) The minimum diameter of heating elements commercially and practically available and properly made to provide efficient heating action is also about one-half inch. The required space for metal tubing or conduits in the casing, for baffles, for chambers, and for the usual construction and arrangement of the same, and proper minimum room in which to work in assembling and mounting the parts, would not appear to be available in such a casing. The foregoing dimensions are given for demonstrating the nature of the problem presented and the lack of a satisfactory teaching in the prior art for solving the problem. The dimensions are not, however, to be considered in themselves as constituting limitations on the scope of the invention disclosed and claimed herein.

A cylindrically shaped electric heating element 23 is positioned, and secured in place, within the casing 11 just rearwardly of the tapered portion 12. The heating element 23, as shown in the enlarged sectional view of Figure 9, comprises an electrical heating coil of resistance wire 26 coiled around a ceramic insulating body 27, a covering 25 of mica or other suitable electric insulating material, and an outer sheath 24 of Monometal, copper, brass or other heat conducting and non-magnetic material. The sheath 24 is of cylindrical shape covering the outer cylindrical surface of the heating element and the end walls thereof.

The heating element 23 has substantially the same outside diameter as the inside diameter of the casing 11 and substantially fills the bore of the casing at its straight or intermediate portion. It is seen from the views of the drawing that the heating element divides the interior of the casing into a forward chamber in advance of the heating element and a rearward chamber rearwardly of the heating element. It is also apparent from the drawing that there is no space for metal tubing or a conduit alongside the heating element and within the casing. To provide passageway within the casing from the forward chamber to the rearward chamber a depression, groove, or channel 28 is formed in the metal sheath 24, the channel extending the length of the heating element adjacent the top thereof. By thus relieving the heating element and casing from each other along a portion of their common cylindrical meeting surfaces a passageway is provided for placing the forward and rearward chambers in communication. It is preferable that the channel 28 be disposed at or near the top of the heating element so as to provide that the communication is between the upper portions of the said chambers.

The forward end face of the heating element provides a first baffle for meeting air and moisture entering the casing through the front opening 13. A discharge port or hole 21 drilled through, or otherwise formed in, the bottom of the casing 11 in advance of the heating element provides for the discharge of moisture entrapped in the forward chamber in advance of the first baffle (front end of the heating element). As the discharge port 21 is located at the lowermost part of the forward chamber the moisture will be discharged as it is entrapped, being forced outwardly by the air pressure.

The closure or rear wall 17 provides a second baffle for meeting air and moisture (if any moisture gets back that far) moving back through the casing. A discharge port or hole 22 drilled through, or otherwise formed in, the bottom of the casing, more particularly the rear-end member 14, in advance of the wall or closure 17 provides for the discharge of moisture entrapped in the rearward chamber in advance of the second baffle wall 17. As the discharge port 22 is located at the lowermost part of the rearward chamber the moisture will be discharged as it is entrapped, being forced outwardly by the air pressure.

In some aircraft a two-wire electrical system is used and in others a single-wire system is used. In the illustration of my invention two wires are shown only by way of example. Suitably insulated wires 29 and 30 extend back from the element 23 and out through the wall 17 (by a hermetic seal therewith) and there connect with plug and pin assembly 31 and 32 and plug and pin assembly 33 and 34, respectively. The electrical circuit arrangement is such that connection of the pins 32 and 34 with a source of electrical energy, such as the battery of the aircraft, energizes the heating element and causes it to generate heat. In a single wire system only the wire 29 and plug and pin assembly 31 and 32 is utilized, the other connection being obtained by grounding to the metal framework of aircraft in the usual manner.

A conduit member or pipe 36 extends through the wall 17 (by a hermetic seal therewith) near the upper portion thereof. The conduit 36 is adapted to communicate with an airspeed indicator in the cockpit of the aircraft by suitable tubing not shown, the threaded nipple 39 being adapted to connect with such tubing. The indicia P on the threaded nipple indicates to the assembler of the apparatus that the nipple is to be connected to the tubing on the Pitot (dynamic or impact pressure) side of the airspeed indicator.

The inner or forward end of the conduit 36 terminates in the upper portion of the rearward chamber as shown in Figure 2. As an added safeguard against moisture entering into the conduit 36 the extreme end of the conduit is closed by a plug or cover 37. An opening 38 is cut or formed in the upper side of the conduit 36. Air and moisture moving rearwardly and axially of the casing is blocked by the cover 37 and air must move through a circuitous path to enter the conduit 36. The cover or closed end 37 thus provides another baffle to be met by moisture entering the casing.

Figures 10 and 11 illustrate a slightly modified form of electrical heating element 23 wherein there are two longitudinal grooves or channels extending lengthwise of the element along the upper portion thereof, the channels being denoted by the reference characters 40 and 41. Other modified forms of passageways for the air are of course suggested by the present disclosure but these are to be considered as included within the present teaching.

Air under dynamic pressure enters the casing through the front opening 13, is baffled by the front end of the heating element 23, passes along the upper portion of the heating element through the channel 28 into the rearward portion of the casing, is baffled by the rear wall 17 and end cover 37, and leaves the casing through the conduit 36. Moisture carried into the casing is entrapped in the forward and rearward chambers and discharged through the respective discharge ports. The heating element 23 being in good thermal connection with the casing 11 around a large or predominating percentage of its cylindrical surface causes the casing to be rapidly and efficiently heated, the heat being properly and thoroughly distributed, and the air in the casing being maintained at above freezing temperature. The air in the channel or passageway 28 is in intimate thermal relationship with the heating element and is efficiently heated, the heat therefrom passing back into casing and being distributed to the air in the casing. It has been found that the arrangement here disclosed not only answers the difficult problems presented by the small diameter casing and the necessity of placing the parts therein, but also provides a Pitot tube of superior operation under varying and severe climatic conditions.

The arrangement also provides for ease and economy in manufacture. For example, with the present arrangement it is not necessary to hermetically seal the peripheral edge of the heating element to the inner wall of the casing as was required in other arrangements. As the front chamber is in communication with the rear chamber it does not matter if there is leakage of air around the side of the heating element. This elimination of the need for making a hermetic seal in such a confined working space is a great advantage. Only enough solder need be introduced into the casing through the front opening 13 as is required to secure the heating element 23 in place to the wall of the casing.

The present construction also obviates the necessity of using metal tubes or conduits within the casing to conduct air through the casing from one end to another, the casing itself acting as the conduit. This provides for a decrease in the weight of the complete Pitot tube, for eliminating the use of a large amount of scarce and critical material (as the metal tubes or conduits are usually of copper or brass), and for facilitating and increasing the manufacturing process and rate.

The assembly of the Pitot tube is simple and facile. With the casting 14 initially separated from the tubular portion of the casing, the heating element with wires extended therefrom is inserted into the rear open end of the casing and positioned as shown in Figure 2. The casting or rear end member 14 is then mounted in position with the wires 29 and 30 extending through the provided holes therein, the member 14 and tubular casing being secured together by silver solder or other suitable means. The respective plug and pin assemblies 31, 32 and 33, 34 are then connected to the wires 29 and 30, and a hermetic seal made between the wires and member 14. The conduit 36 is inserted through a provided hole in the member 14 to the position shown in Figure 2 and a hermetic seal effected with the member 14. The heating element 23 is secured in position by silver solder introduced into the casing through the opening 13. The assembled tube is then ready to be mounted in position and connected to the Pitot air line tubing of the aircraft and then to the provided electrical terminals.

The references to "upper" and "lower," portions or directions are directed to the upper and lower horizontal parts of the Pitot tube as disposed in Figures 1 and 2. The tube is mounted to aircraft in the horizontal position shown in Figures 1 and 2 and the references to "upper," "below," "above," "lower," "top," and "bottom" are based upon the disposition of the tube in this horizontal plane.

In the description and claims reference is sometimes made to the passing, the entering, the moving, or the flowing of air through the casing, passageways, conduiti, chambers and tubing. This language is used in a broad, and perhaps not always accurate, sense for the purpose of making the interrelationship of the parts more apparent and clear. It is understood, however, that under stable conditions when the casing, passageways, conduit, chambers, and tubing are full of air and the operating conditions remain the same (no change in speed), there is little or no movement or actual flow of air through the said casing, passageways, conduit, chambers, and tubing as the tubing or pipe connected to the threaded nipple 39 terminates in a closed chamber in the airspeed indicator. There is a transmission of pressure of the contained air which for purposes of illustration and simplicity is loosely referred to as flow of air.

The present disclosure includes the description in the appended claims as well as in the foregoing specification, the description contained in the claims being incorporated herein by reference.

Although I have described my invitation with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a Pitot tube, a longitudinal hollow casing, said casing having an open forward end for receiving air under dynamic pressure, an electrical heating element mounted in said casing rearwardly of said open forward end, said heating element substantially filling the internal cross-sectional area of the casing to form a first chamber in the casing intermediate the heating element and said open forward end, a closure closing the rear end portion of the casing and forming a second chamber in the casing intermediate of the closure and said heating element, said heating element including an electrical resistance coil and a metallic sheath enveloping said coil, said sheath having a channel formed therein and extended longitudinally of the element to provide passageway for said air under dynamic pressure between the said casing and the said heating element and connecting said first chamber and said second chamber, a conduit member adapted to communicate with an air speed indicator and extending through said closure into said second chamber and opening into the upper portion of said second chamber, the said conduit member having a shield portion in advance of the conduit opening to prevent direct ingress into the conduit member axially and rearwardly of the casing, said first chamber and said second chamber each having a discharge port extended through the bottom of the casing, and electrical connecting means for energizing said heating element, the arrangement of the casing, the discharge ports, the heating element, the closure, and the conduit member providing for entrapment of moisture in the first chamber in advance of the heating element and the discharge thereof through the respective discharge port, for the entrapment of moisture in the second chamber in advance of the closure and the discharge thereof through the respective discharge port, for the passage of air along the channeled sheath of the heating element intermediate of the first and second chambers, for the heating of the casing and the air within said casing to maintain moisture in the air at above freezing temperature, and for the passage of air under dynamic pressure from said forward end through the casing and into said conduit member.

2. In a Pitot tube, a hollow casing having substantially parallel longitudinal walls, said casing having an opening at its forward end for receiving air under dynamic pressure, a transversely disposed wall at the rearward portion of the casing for closing said casing, an electric heating element positioned in said casing intermediate of, and spaced from, said open forward end and said wall and substantially filling the internal bore of said casing to form a first chamber in advance of the heating element and a second chamber in advance of the said wall, said heating element including a suitably electrically insulated electric resistance coil and a sheath of metal enclosing said coil, the metal sheath of said element partially complementing and engaging the internal wall of the casing and transmitting heat thereto, the said metal sheath being relieved from the internal wall of the casing along a portion of the longitudinal wall of the sheath to provide an air passageway alongside the heating element and within said casing for connecting said first and second chambers in communication, said first chamber and said second chamber collecting moisture entering said casing, there being discharge port means for discharging moisture collected in said chambers outwardly through the bottom of the casing, and a conduit member adapted to communicate with an airspeed indicator and extended through said transversely disposed wall and opening into said second chamber, air under dynamic pressure entering the casing through said open forward end having the moisture carried thereby maintained at above freezing temperature and discharged from said chambers through said discharge port means and said air passing through said casing from the first chamber to the second chamber alongside of the said heating element and thence to said conduit member.

3. A Pitot tube comprised of a hollow cylindrical casing having an open forward end for receiving air under dynamic pressure, a closure adjacent the rearward end of the casing for closing said casing, a cylindrically shaped heating element concentrically positioned in said casing intermediate, and spaced from, said forward end and said closure to provide a forward chamber in advance of the heating element and a rearward chamber intermediate of said heating element and said closure, the outer cylindrical surface of said heating element engaging the internal cylindrical wall of the casing, said heating element having a longitudinal passageway extending therealong to provide communication through the casing from the forward chamber to the rearward chamber, said passageway being depressed in said heating element inwardly of said outer cylindrical surface, the forward end of the heating element forming a first baffle encountered by said air under dynamic pressure and the said closure forming a second baffle encountered by said air under dynamic pressure, there being a discharge port through the bottom of the casing in advance of each of said baffles to discharge moisture entering the casing with said air and entrapped in each said chamber in advance of the respective baffles, and a conduit member adapted to communicate with an airspeed indicator and extended through said closure to communicate with said rearward chamber, the moisture entering said casing with said air under dynamic pressure being maintained at above freezing temperature by said heating element and the air under dynamic pressure being supplied from said forward end to said conduit member through the said casing.

4. In a Pitot tube, a metallic cylindrical casing having an open forward end and a closed rearward end, a conduit entering the rearward portion of the casing through said closed end for providing communication between the interior of the casing and an airspeed indicator, an electrical heating element positioned in said casing intermediate, and spaced from, the open forward end and the closed rearward end, said heating element substantially filling the cross-sectional area of said casing to baffle moisture entering said casing through said forward end, said heating element including an electrical resistance coil and a cylindrical metallic sheath enclosing said coil, said sheath having an outside diameter substantially equal to the inside diameter of said casing and being disposed concentrically with said casing, said sheath and casing being relieved from each along a portion of their complementary cylindrical surfaces at the upper portion of said sheath to permit passage of air through the casing along said upper portion of the sheath from said open forward end to said rearward portion, the air entering the casing through said open forward end being maintained at above freezing temperature by seat heating element and being supplied to said conduit from the said rearward portion of the casing.

5. In a Pitot tube, a metallic cylindrical casing having an open forward end and closed rearward end and having a forward portion, a rearward portion and an intermediate portion, said intermediate portion having a uniform bore throughout, said forward portion having a gradually increasing bore having its minimum bore at said forward end and its maximum bore coinciding with the bore of said intermediate portion, said rearward portion having a gradually increasing bore having its minimum bore coinciding with the bore of said intermediate portion and its maximum bore at said closed end, an electrical heating element including a cylindrical metallic sheath and an electrical heating coil enveloped by said sheath, said sheath having an outside diameter substantially equal to the inside diameter of the said intermediate portion of the casing, said element being concentrically mounted in the bore of said intermediate portion to divide the casing into a forward chamber and a rearward chamber, there being a discharge port through the bottom of the casing at the maximum diameter of said forward portion to discharge from the casing moisture entrapped in said first chamber in advance of the heating element and there being a discharge port through the bottom of the casing at the maximum diameter of said rearward portion to discharge from the casing moisture entrapped in said second chamber in advance of said closed end, said heating element having a passageway extending along the length of said heating element radially inward from, and adjacent the upper portion of, the circumferential surface of the said element to provide communication between the respective upper portions of said first and second chambers, and a conduit extending into said casing and opening into the upper portion of said second chamber adjacent the maximum diameter of said rearward portion, said conduit being adapted to provide communication with an airspeed indicator, air under dynamic pressure entering said casing through said open forward end being maintained at above freezing temperature by said heating element to provide for the discharge of moisture from the casing and being supplied through the casing to said conduit.

6. In a Pitot tube, a cylindrical casing having an open forward end, an electrical heating element filling the cross-sectional area of the casing at a distance rearwardly of said open forward end to provide a first baffle, said element including a cylindrical metal sheath and a resistance coil covered by said sheath, a closure at the rearward end of the casing at a distance rearwardly of said heating element to provide a second baffle, there being discharge port means in advance of each said baffle to provide for outward discharge of moisture entrapped by said baffles, said heating element having air passageway means extended along the upper portion thereof and within the outer cylindrical surface of said sheath, said passageway means terminating at the opposite ends of the element and providing communication through the casing along the upper portion thereof, a conduit extended through said closure adjacent the upper portion thereof, said conduit having an opening into said casing, said opening being directed other than directly forward of the casing to avoid entrance of moisture moving longitudinally and rearwardly of the casing, said conduit being adapted to communicate with an airspeed indicator, air under dynamic pressure entering the casing through said open forward end being supplied to said conduit at a temperature above freezing temperature by the heating action of the heating element and devoid of the moisture entrapped by said baffles and discharged by said discharge port means.

7. In a Pitot tube for an aircraft, a hollow metal casing, said casing having a straight cylindrical portion adapted to be disposed axially of the line of flight of said aircraft, a nose portion extended forwardly of said cylindrical portion and an enlarged portion extended from the rearward end of said cylindrical portion, the forward end of the nose portion being open to receive air under dynamic pressure and the terminus of said enlarged portion being closed, the internal bores of said nose portion, cylindrical portion and enlarged portion forming the cavity of said casing, a cylindrical electrical heating element concentrically mounted in said cylindrical portion of the casing and substantially filling the bore thereof to separate the cavity in said nose portion from the cavity in said enlarged portion, said heating element including a cylindrical metal sheath and an electrical resistance wire enveloped by said sheath, said sheath having a longitudinal passageway extended along its length within the confine of the outer cylindrical surface thereof to provide communication between the cavity in said nose portion and the cavity in said enlarged portion, there being discharge port means for discharging from the casing moisture entering the cavity of said nose portion and the cavity of said enlarged portion, and conduit means communicating with the cavity of said enlarged portion for providing communication with an airspeed indicator, air under dynamic pressure entering said casing through the open front end thereof being heated above freezing temperature by said heating element in passing through the casing to said conduit means to assure fluidity of moisture in the casing and discharge thereof through the discharge port means.

8. A Pitot tube comprising a hollow casing having an opening at its forward end for receiving air under dynamic pressure, an electrical heating element positioned in the casing intermediate its opposite ends, said heating element substantially filling the cross-sectional area of the casing to divide the interior of the casing into a forward chamber and a rearward chamber, there being an open space between the outside wall of said heating element and the inside wall of said casing adjoining the upper portion of the heating element to provide communication for air between said chambers, the said heating element baffling moisture entering said casing through said open end and heating said casing and air contained therein to prevent freezing of moisture therein, there being discharge port means for discharging from the casing moisture entering therein through said open end, and conduit means opening up into the upper portion of said rearward chamber to provide communication between the interior of said casing and a pipe leading to an airspeed indicator.

EMIL DAIBER.